(12) United States Patent
Kleinfeld et al.

(10) Patent No.: US 11,892,039 B2
(45) Date of Patent: Feb. 6, 2024

(54) ENERGY ABSORBING CONSTANT VELOCITY JOINT BOOT ASSEMBLY

(71) Applicant: Steering Solutions IP Holding Corporation, Saginaw, MI (US)

(72) Inventors: Brian J. Kleinfeld, Saginaw, MI (US); Jeffrey P. Courville, Frankenmuth, MI (US); Thomas M. Schomaker, Saginaw, MI (US); Martin P. Sheridan, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 307 days.

(21) Appl. No.: 17/012,954

(22) Filed: Sep. 4, 2020

(65) Prior Publication Data

US 2020/0400197 A1 Dec. 24, 2020

Related U.S. Application Data

(62) Division of application No. 15/787,171, filed on Oct. 18, 2017, now Pat. No. 10,788,079.

(60) Provisional application No. 62/468,720, filed on Mar. 8, 2017.

(51) Int. Cl.
| | |
|---|---|
| *F16D 3/84* | (2006.01) |
| *F16J 3/04* | (2006.01) |
| *F16D 3/16* | (2006.01) |
| *F16D 3/20* | (2006.01) |

(52) U.S. Cl.
CPC .............. *F16D 3/845* (2013.01); *F16D 3/16* (2013.01); *F16D 3/20* (2013.01); *F16J 3/042* (2013.01); *F16J 3/043* (2013.01); *F16D 2300/08* (2013.01); *F16J 3/041* (2013.01)

(58) Field of Classification Search
CPC ... F16D 3/845; F16D 3/16; F16D 3/20; F16D 2300/08; F16J 3/042; F16J 3/043; F16J 3/041
USPC .................. 464/175, 173; 277/651, 634–636
See application file for complete search history.

(56) References Cited

U.S. PATENT DOCUMENTS

| | | | | |
|---|---|---|---|---|
| 3,204,427 | A * | 9/1965 | Dunn ..................... | F16D 3/2052 464/175 |
| 4,456,269 | A * | 6/1984 | Krude ..................... | F16J 3/042 464/175 |
| 6,921,091 | B2 * | 7/2005 | Neviani ................... | F16J 3/042 464/175 |
| 6,932,356 | B2 * | 8/2005 | Gloaguen ................ | F16J 3/046 464/175 |
| 8,393,624 | B2 * | 3/2013 | Hoets ...................... | F16D 3/845 464/175 |
| 8,814,174 | B2 * | 8/2014 | Okuda ................... | F16J 15/122 277/651 |
| 11,248,661 | B2 * | 2/2022 | Deisinger ............... | F16D 3/845 |

FOREIGN PATENT DOCUMENTS

GB 709117 * 5/1954 .................... 464/175

* cited by examiner

*Primary Examiner* — Greg Binda
(74) *Attorney, Agent, or Firm* — Dickinson Wright PLLC

(57) ABSTRACT

A constant velocity joint boot assembly includes a flexible boot having a flexible portion extending between a first end and a second end along an axis. The first end is disposed about a portion of a constant velocity joint and the second end is disposed about a portion of a shaft assembly. The first end defines a skirt having an engineered portion that elastically absorbs and/or reflects impact energy.

11 Claims, 4 Drawing Sheets

ENERGY ABSORBING CONSTANT VELOCITY JOINT BOOT ASSEMBLY

CROSS-REFERENCES TO RELATED APPLICATIONS

This application is a divisional application of U.S. application Ser. No. 15/787,171, filed Oct. 18, 2017, now U.S. Pat. No. 10,788,079, which claims the benefit of U.S. Provisional Patent Application No. 62/468,720, filed Mar. 8, 2017, filed Mar. 8, 2017, both of which are incorporated herein by reference in their entirety.

BACKGROUND

Constant velocity joints are commonly used on automobile drive axles and are enclosed with a sealing boot. The sealing boot is fixed to the constant velocity joint and is designed to retain grease within the constant velocity joint and to prevent outside elements from entering the constant velocity joint during joint rotation, joint angulation, and plunging.

SUMMARY

According to an embodiment of the present disclosure, a constant velocity joint boot assembly is provided. The constant velocity joint boot assembly includes a flexible boot having a flexible portion extending between a first end and a second end along an axis. The first end is disposed about a portion of a constant velocity joint and the second end is disposed about a portion of a shaft assembly. The first end defines a skirt having an engineered portion that elastically absorbs and/or reflects impact energy.

According to another embodiment of the present disclosure, a constant velocity joint boot assembly is provided. The constant velocity joint boot assembly includes a flexible boot having a flexible portion extending between a first end and a second end along an axis. The first end defines a skirt having an engineered portion that extends between at a distal end having a retaining tab and a proximal end of the first end that is disposed adjacent to the flexible portion. The engineered portion is provided with an integrally molded raised bumper that is disposed at the proximal end of the first end and is disposed adjacent to the flexible portion.

According to yet another embodiment of the present disclosure, a constant velocity joint boot assembly is provided. The constant velocity joint boot assembly includes a flexible boot having a flexible portion extending between a first end and a second end along an axis. The first end defines a skirt having an engineered portion that is provided with an integrally molded raised bumper that contains an insert.

Advantages of the design features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and benefits of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
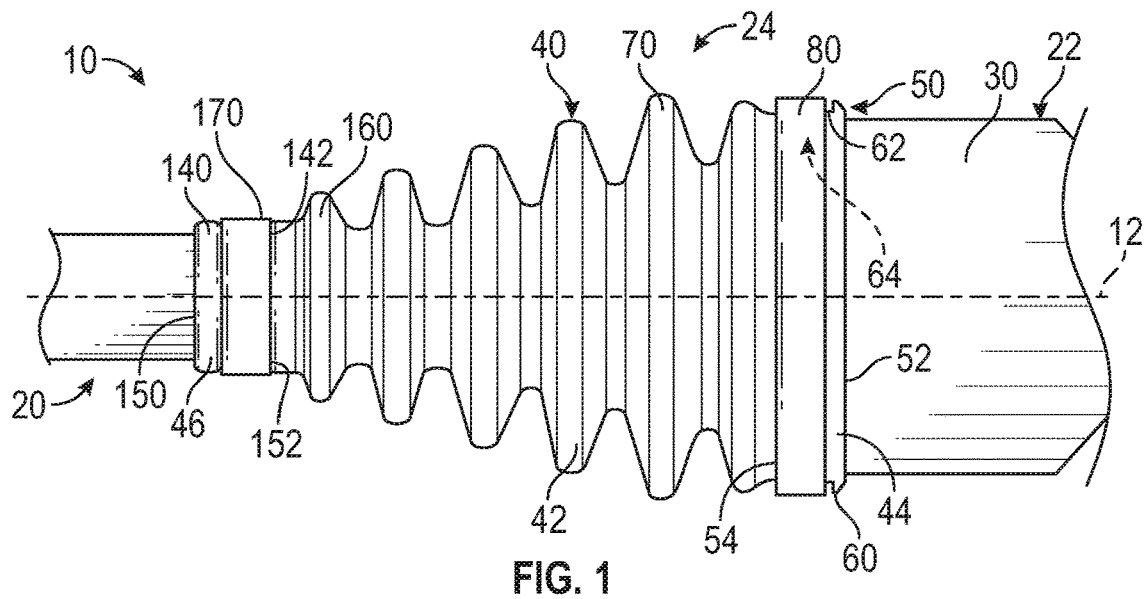
FIG. 1 is a side view of a shaft system.

Referring to FIG. 1, a shaft system 10 extends along and is rotatable about an axis 12. The shaft system 10 includes a shaft assembly 20, a constant velocity joint 22, and a constant velocity joint boot assembly 24.

The shaft assembly 20 is arranged to rotate about the axis 12. The shaft assembly 20 may include a first shaft that is operatively connected to a second shaft. One of the first shaft or the second shaft is connected to a source of rotation such as a transmission output shaft while the other is connected to a rotatable member such as a wheel, wheel hub, or the like.

The constant velocity joint 22 is disposed at or about an intersection between the first shaft and the second shaft of the shaft assembly 20. The constant velocity joint 22 is arranged to facilitate the rotation, articulation, angulation, and/or plunging of the first shaft relative to the second shaft. The constant velocity joint 22 includes an outer member 30 that is operatively connected to an inner member, at least one of the first shaft or the second shaft of the shaft assembly 20, and a plurality of rolling elements that are disposed between the outer member 30 and the inner member.

Figure 2:
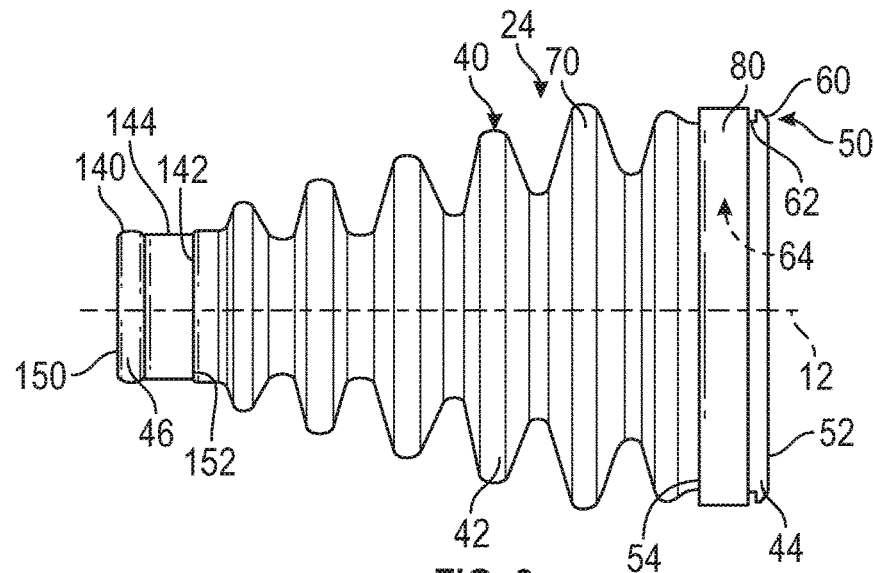
FIG. 2 is a side view of a constant velocity joint boot assembly of the shaft system.
Figure 3:
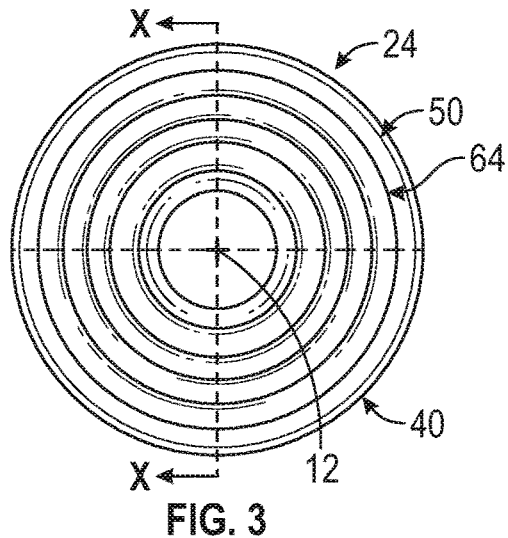
FIG. 3 is an end view of the constant velocity joint boot assembly of FIG. 2.

Referring to FIGS. 1 and 2, the constant velocity joint boot assembly 24 is disposed about at least a portion of the constant velocity joint 22 and the shaft assembly 20. The constant velocity joint boot assembly 24 is arranged to retain a lubricant or grease within the constant velocity joint 22 and to inhibit the intrusion or outside elements or objects from entering the constant velocity joint 22 during constant velocity joint 22 rotation, angulation, oscillation, or plunging.

The constant velocity joint boot assembly 24 includes a flexible boot 40 that extends between a first end 44 and a second end 46 along an axis 12. The first end 44 is disposed about a portion of the constant velocity joint 22, such as the outer member 30. The first end 44 has a first diameter.

The flexible boot 40 has a flexible portion 42 that extends between the first end 44 and the second end 46 along an axis 12. The flexible portion 42 may have a varying cross-sectional diameter or a varying cross-sectional form between the first end 44 and the second end 46. The flexible portion 42 is illustrated as a convoluted portion having a plurality of convolutes in the figures but the flexible portion 42 may also be configured as a bellows, a corrugated portion, a flexible conical portion, or the like that enables the flexible boot 40 to be flexible.

Referring to FIGS. 1, 2, 4-6, and 8-9, the first end 44 of the flexible boot 40 defines a skirt 50 that extends between a distal end 52 of the first end 44 towards a proximal end 54 of the first end 44 that is disposed proximate or adjacent to the flexible portion 42.

The skirt 50 includes a retaining tab 60, a recess 62, and an engineered portion 64. The retaining tab 60 is disposed at the distal end 52 of the first end 44. The retaining tab 60 extends away from the distal end 52 of the first end 44 in a direction that extends away from the axis 12.

The recess 62 is defined by the skirt 50 and extends between the retaining tab 60 and the proximal end 54 or extends between the retaining tab 60 and a first convolute 70 of the flexible portion 42 that is disposed proximate or adjacent the proximal end 54 of the first end 44. The skirt 50 is provided with an engineered portion 64 that is arranged to elastically absorb and/or reflect impact energy. A thickness, t, of the engineered portion 64 is greater than a wall thickness, tw, of the flexible portion 42.

A first band clamp 80 is disposed about the first end 44 of the flexible boot 40 to operatively connect the flexible boot 40 to the outer member 30 of constant velocity joint 22. The first band clamp 80 is received within the recess 62 and is disposed about the engineered portion 64.

The engineered portion 64 has a cross-sectional thickness that is chosen to absorb energy during an impact event to prevent or inhibit damage to the first band clamp 80 and the outer member 30 of the constant velocity joint 22 determined by the predicted mass, velocity, and direction associated with an impact event.

Figure 4:
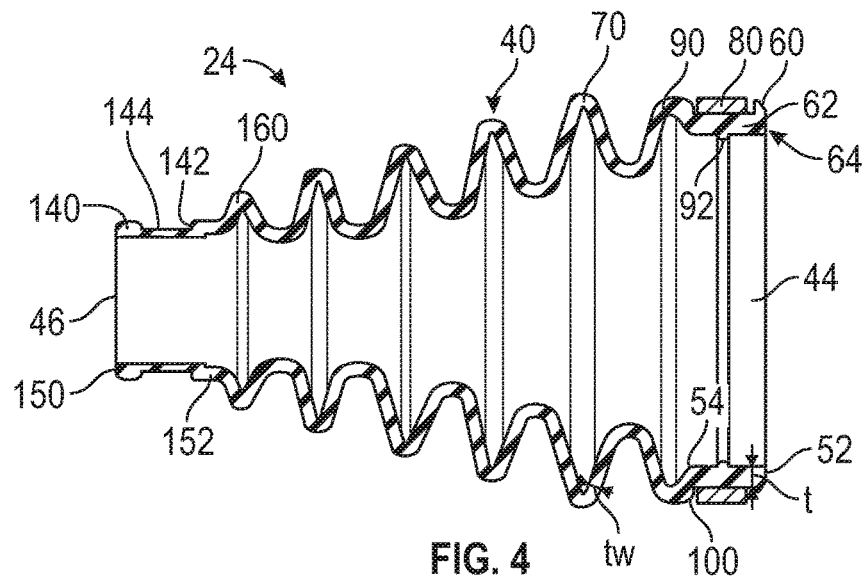
FIGS. 4 and 5 are cross-sectional views of the constant velocity joint boot assembly of FIG. 3 along section X-X.
Figure 5:
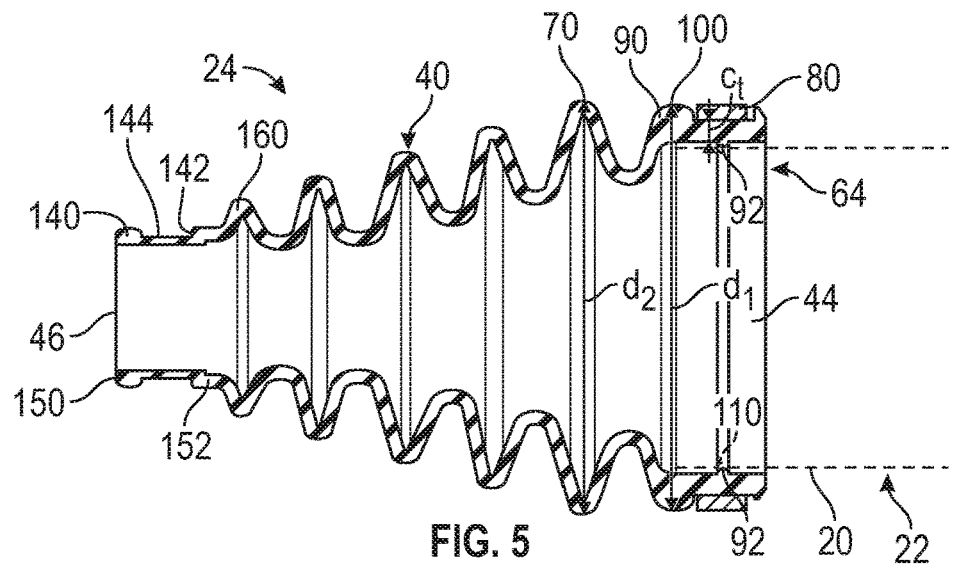

Referring to FIGS. 4 and 5, the engineered portion 64 is provided with a first bumper 90 and/or a second bumper 92. The first bumper 90 is disposed at the proximal end 54 of the first end 44 proximate the flexible portion 42 such that the first bumper 90 is disposed between the flexible portion 42 and the distal end 52 of the first end 44. The first bumper 90 is disposed proximate a side of the first band clamp 80 that is disposed proximate the proximal end 54 of the first end 44 such that the first bumper 90 is disposed between the first band clamp 80 and the flexible portion 42. The recess 62 is disposed between the first bumper 90 and the retaining tab 60.

The first bumper 90 is disposed substantially transverse to the axis 12 and extends away from the axis 12. The first bumper 90 is disposed generally parallel to the retaining tab 60. The first bumper 90 defines a prevailing surface 100 having a substantially smooth profile that is disposed at a distal end or tip of the first bumper 90. A height of the first bumper 90 is substantially equal to a height of the retaining tab 60.

A diameter, d1, of the first bumper 90 is disposed between diametrically opposed prevailing surfaces of the first bumper 90. Diameter, d1, may be less than a diameter, d2, of the first convolute 70, as shown in FIGS. 1 and 5. The diameter, d1, may be substantially equal to the diameter, d2, of the first convolute 70, as shown in FIG. 4. The diameter, d1, of the first bumper 90 is greater than a diameter of the first band clamp 80. The diameter, d1, and a cross-sectional thickness, Ct, of the first bumper 90 are chosen such that in the event that at least one of the first shaft or the second shaft of the shaft assembly 20 is impacted, the prevailing surface 100 of the first bumper 90 may elastically absorb energy and inhibit damage to the first band clamp 80 and inhibit a puncture to the flexible boot 40.

The second bumper 92 of the engineered portion 64 is disposed between the first bumper 90 and the retaining tab 60. The second bumper 92 is disposed opposite the recess 62 that receives the first band clamp 80 and extends towards the axis 12, as shown in FIGS. 4, 5, 8, and 9. The second bumper 92 extends into or is at least partially received by a pocket 110 formed within the outer member 30 of the constant velocity joint 22. The second bumper 92 being received within the pocket 110 to aid in retaining the flexible boot 40 on the constant velocity joint 22.

Figure 6:
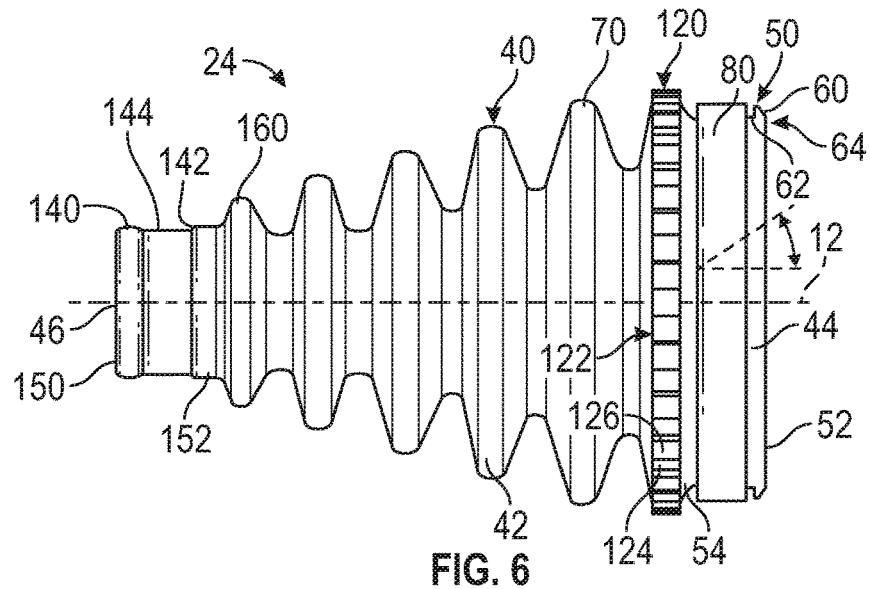
FIG. 6 is a side view of a constant velocity joint boot assembly.
Figure 7:
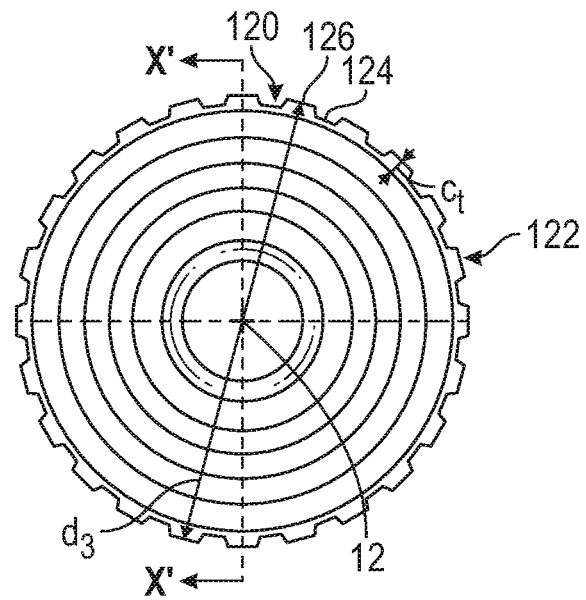
FIG. 7 is an end view of the constant velocity joint boot assembly of FIG. 6.
Figure 8:
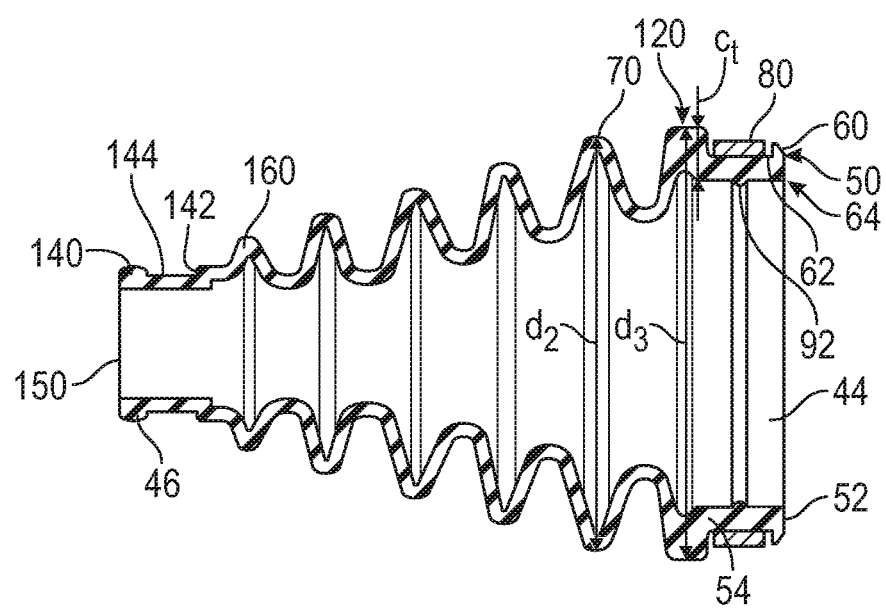
FIG. 8 is a cross-sectional view of the constant velocity joint boot assembly of FIG. 7 along section line X'-X'.

Referring to FIGS. 6-8, the engineered portion 64 is provided with an integrally molded raised bumper 120 that is disposed at the proximal end 54 of the first end 44. The integrally molded raised bumper 120 is disposed adjacent to the first band clamp 80 such that the integrally molded raised bumper 120 is disposed proximate the proximal end 54 of the first end 44 such that the integrally molded raised bumper 120 is disposed between the first band clamp 80 and the flexible portion 42. The recess 62 is disposed between the integrally molded raised bumper 120 and the retaining tab 60.

Referring to FIGS. 6 and 7, the integrally molded raised bumper 120 is provided with a plurality of protrusions 122 that radially extend from an outer surface 124 of the integrally molded raised bumper 120. The plurality of protrusions 122 disposed on or defined by the outer surface 124 creates a textured outer surface of the integrally molded raised bumper 120. The tip or tip surface of each of the plurality of protrusions 122 may define the prevailing surface 126 of the integrally molded raised bumper 120. A height of the integrally molded raised bumper 120 is greater than a height of the retaining tab 60.

Referring to FIGS. 6 and 8, a diameter, d3, of the integrally molded raised bumper 120 is measured between diametrically opposed prevailing surfaces of the integrally molded raised bumper 120. The diameter, d3, of the integrally molded raised bumper 120 is greater than a diameter of the first band clamp 80. The diameter, d3, may be substantially equal to the diameter, d2, of the first convolute 70. The diameter, d3, may be equal to the diameter, d2, of the first convolute 70, as shown in FIG. 6. The diameter, d3, may be greater than the diameter, d2, of the first convolute 70, as shown in FIG. 8. The diameter, d3, and a cross-sectional thickness, Ct, of the integrally molded raised bumper 120 are chosen such that in the event that at least one of the first shaft or the second shaft of the shaft assembly 20 is impacted, the prevailing surface 126 of the plurality of protrusions 122 of the integrally molded raised bumper 120 may elastically absorb energy and inhibit damage to the first band clamp 80 and inhibit a puncture to the flexible boot 40.

Figure 10:
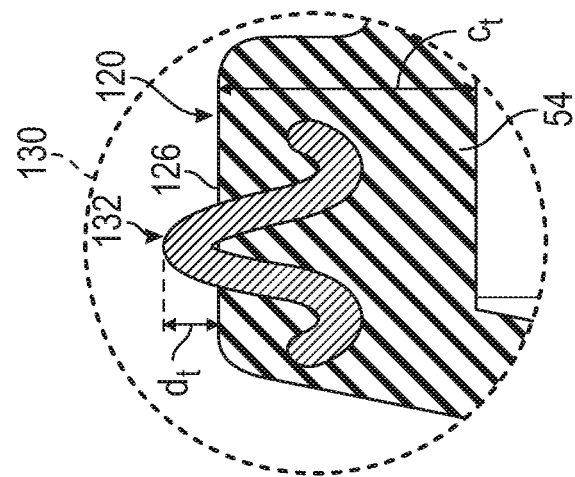
FIGS. 9 and 10 are various views of a constant velocity joint composite insert boot assembly.
Figure 9:
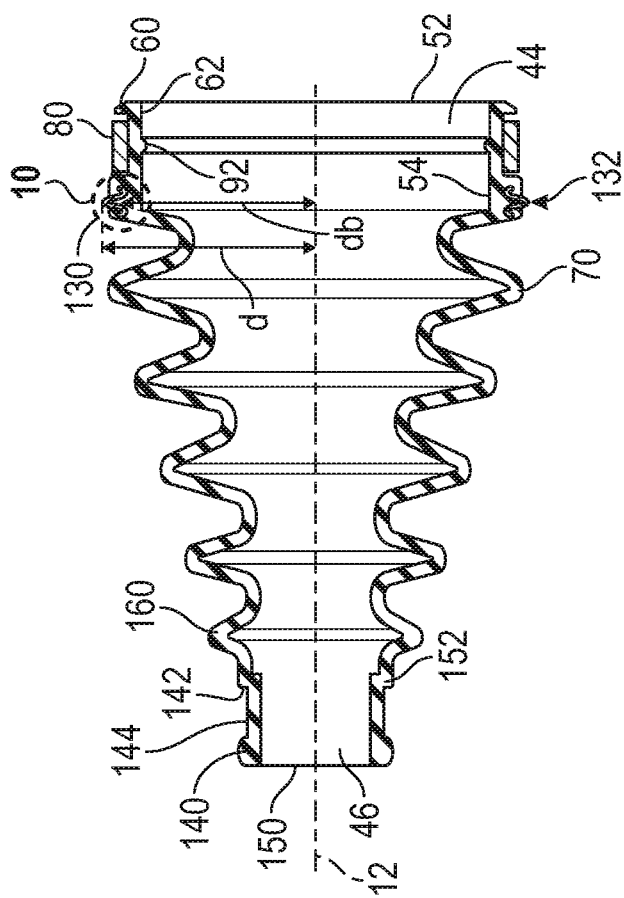

Referring to FIGS. 9 and 10, the engineered portion 64 is provided with a composite insert molded raised bumper 130. The composite insert molded raised bumper 130 is disposed adjacent to the first band clamp 80 such that the composite insert molded raised bumper 130 is disposed proximate the proximal end 54 of the first end 44 such that the composite insert molded raised bumper 130 is disposed between the first band clamp 80 and the flexible portion 42.

The composite insert molded raised bumper 130 includes the integrally molded raised bumper 120 and an insert 132 that extends from the integrally molded raised bumper 120. The insert 132 may be configured as a biasing member that is molded into the integrally molded raised bumper 120. A portion of the insert 132 extends beyond the prevailing surface 126 in a direction that extends away from the axis 12.

A distance, d, measured between the axis 12 and a tip of the insert 132 is greater than a distance, db, measured between the axis 12 and an outer surface of the first band clamp 80. The diameter, d3, of the integrally molded raised bumper 120, a distance, dt, between the prevailing surface 126 and a tip of the insert 132, and the cross-sectional thickness, Ct, of the integrally molded raised bumper 120 of the composite insert molded raised bumper 130 are chosen such that in the event that at least one of the first shaft and the second shaft of the shaft assembly 20 is impacted, the tip of the insert 132 and/or the outer surface 124 of the integrally molded raised bumper 120 of the composite insert molded raised bumper 130 may be impacted and may elastically absorb energy and inhibit damage to the first band clamp 80 and inhibit a puncture to the flexible boot 40.

Referring to FIGS. 1, 2, 4-6, 8, and 9, the second end 46 is disposed about a portion of at least one of the first shaft or the second shaft of the shaft assembly 20. The second end 46 has a second diameter that is less than the first diameter of the first end 44.

The second end 46 includes a second retaining tab 140, a shoulder 142, and a second recess 144. The second retaining tab 140 is disposed at a distal end 150 of the second end 46. The second retaining tab 140 extends away from the distal end 150 of the second end 46 in a direction that extends away from the axis 12.

The shoulder 142 is spaced apart from second retaining tab 140 and is disposed at a proximal end 152 of the second end 46. The shoulder 142 is at least partially defined by the second recess 144 and is disposed generally perpendicular to the axis 12. The shoulder 142 is disposed proximate or adjacent a second convolute 160 that is completely spaced apart from and disposed opposite the first convolute 70.

The second recess 144 is defined by the second end 46 and is disposed between the second retaining tab 140 and the shoulder 142. A second band clamp 170 is disposed about the second end 46 of the flexible boot 40 to operatively connect the flexible boot 40 to at least one of the first shaft or the second shaft of the shaft assembly 20. The second band clamp 170 is received within the second recess 144, as shown in FIG. 1, to secure the second end 46 of the flexible boot 40 of the constant velocity joint boot assembly 24 to the shaft assembly 20.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the present disclosure, it is claimed:

1. A constant velocity joint boot assembly, comprising:
   a flexible boot having a flexible portion extending between a first end and a second end along an axis, the first end defining an annular skirt having an engineered portion that is provided with a band clamp region and an annular, integrally molded raised bumper that contains an annular insert, the annular, integrally molded raised bumper and the annular insert being disposed between the flexible portion and the band clamp region.

2. The constant velocity joint boot assembly of claim 1, wherein a portion of the insert extends beyond an outer surface of the integrally molded raised bumper.

3. The constant velocity joint boot assembly of claim 2, wherein a distance measured between the axis and a tip of the insert is greater than a distance measured between the axis and an outer surface of a first band clamp positioned about the engineered portion.

4. The constant velocity joint boot assembly of claim 1, wherein a height of a tip of the insert is greater than or equal to a height of a first convolute adjacent the integrally molded raised bumper.

5. The constant velocity joint boot assembly of claim 1, wherein the entirety of the insert is radially aligned with the integrally molded raised bumper.

6. A constant velocity joint boot assembly, comprising:
   a flexible boot having a flexible portion including a plurality of convolutes extending between a first end and a second end along an axis, the first end defining a skirt having an engineered portion that extends between a distal end having a retaining tab and a proximal end that is disposed adjacent to the flexible portion, the engineered portion is provided with an integrally molded raised bumper that is disposed at the proximal end and is disposed adjacent to the flexible portion, wherein the integrally molded raised bumper is provided with a plurality of protrusions that radially extend from an outer surface of the integrally molded raised bumper;
   wherein the skirt defines a recess that is disposed between the integrally molded raised bumper and the retaining tab and is arranged to receive a first band clamp; and
   wherein a diameter of the integrally molded raised bumper is greater than a diameter of the first band clamp.

7. The constant velocity joint boot assembly of claim 6, wherein the engineered portion is arranged to elastically absorb and/or reflect impact energy.

8. A constant velocity joint boot assembly, comprising:
   a flexible boot having a flexible portion including a plurality of convolutes extending between a first end and a second end along an axis, at least some of the convolutes having different diameters from one another, the first end defining a skirt having an engineered portion that extends between a distal end having a retaining tab and a proximal end that is disposed adjacent to the flexible portion, the engineered portion is provided with an integrally molded raised bumper that is disposed at the proximal end and is disposed adjacent to the flexible portion, wherein the integrally molded raised bumper is provided with a plurality of protrusions that radially extend from an outer surface of the integrally molded raised bumper;
   wherein the skirt defines a recess that is disposed between the integrally molded raised bumper and the retaining tab and is arranged to receive a first band clamp; and
   wherein a diameter of the integrally molded raised bumper is greater than a first convolute of the plurality of convolutes, with the first convolute being disposed proximate the proximal end of the first end.

9. A constant velocity joint boot assembly, comprising:
   a flexible boot having a flexible portion extending between a first end and a second end along an axis, the first end defining a skirt having an engineered portion that extends between a distal end having a retaining tab and a proximal end of the first end that is disposed adjacent to the flexible portion, the engineered portion is provided with an integrally molded raised bumper that is disposed at the proximal end of the first end and is disposed adjacent to the flexible portion, with a band clamp region, configured for receipt of a band clamp, extending between the integrally molded raised bumper and the retaining tab, wherein the engineered portion is arranged to elastically absorb and/or reflect impact energy, wherein the integrally molded raised bumper is provided with a plurality of protrusions that radially extend from an outer surface of the integrally molded raised bumper, wherein a height of the integrally molded raised bumper is greater than a height of the retaining tab.

10. A constant velocity joint boot assembly, comprising:
a flexible boot having a flexible portion including a plurality of convolutes extending between a first end and a second end along an axis, the first end defining a skirt having an engineered portion that extends between a distal end having a retaining tab and a proximal end that is disposed adjacent to the flexible portion, the engineered portion is provided with an integrally molded raised bumper that is disposed at the proximal end and is disposed adjacent to the flexible portion, with a band clamp region, configured for receipt of a band clamp, extending between the integrally molded raised bumper and the retaining tab, wherein the integrally molded raised bumper is provided with a plurality of protrusions that radially extend from an outer surface of the integrally molded raised bumper; and
wherein a height of the integrally molded raised bumper is greater than or equal to a height of the retaining tab.

11. A constant velocity joint boot assembly, comprising:
a flexible boot having a flexible portion including a plurality of convolutes extending between a first end and a second end along an axis, at least some of the convolutes having different diameters from one another, the first end defining a skirt having an engineered portion that extends between a distal end having a retaining tab and a proximal end that is disposed adjacent to the flexible portion, the engineered portion is provided with an integrally molded raised bumper that is disposed at the proximal end and is disposed adjacent to the flexible portion, wherein the integrally molded raised bumper is provided with a plurality of protrusions that radially extend from an outer surface of the integrally molded raised bumper; and
wherein a height of the integrally molded raised bumper is greater than or equal to a height of a first convolute adjacent the integrally molded raised bumper.

* * * * *